United States Patent [19]
Plamper

[11] 3,777,585
[45] Dec. 11, 1973

[54] VARIABLE SPEED DRIVE HAVING SPEED LIMITING MEANS

[75] Inventor: Gunter F. Plamper, Lakewood, Ohio

[73] Assignee: MTD Products Inc., Cleveland, Ohio

[22] Filed: Jan. 10, 1973

[21] Appl. No.: 322,500

Related U.S. Application Data

[62] Division of Ser. No. 116,443, Feb. 18, 1971, Pat. No. 3,583,535.

[52] U.S. Cl. .................................... 74/230.17 D
[51] Int. Cl. .......................................... F16h 55/22
[58] Field of Search ............ 74/230.17 D, 242.15 R, 74/242.11 P

[56] References Cited
UNITED STATES PATENTS
3,628,390  12/1971  Van Der Lely et al...... 74/230.17 D

*Primary Examiner*—Leonard H. Gerin
*Attorney*—Bruce B. Krost

[57] ABSTRACT

A variable speed drive for a tractor or the like having a pulley-and-belt driving arrangement between engine and driving wheel providing adjustable variation in the speed and adjustable means for limiting the degree of variation in the speed. This is an abstract only of the specific illustration of the invention given by way of example, and is not to be used in the interpretation of the claims nor as a limitation on the scope of the invention.

3 Claims, 6 Drawing Figures

3,777,585

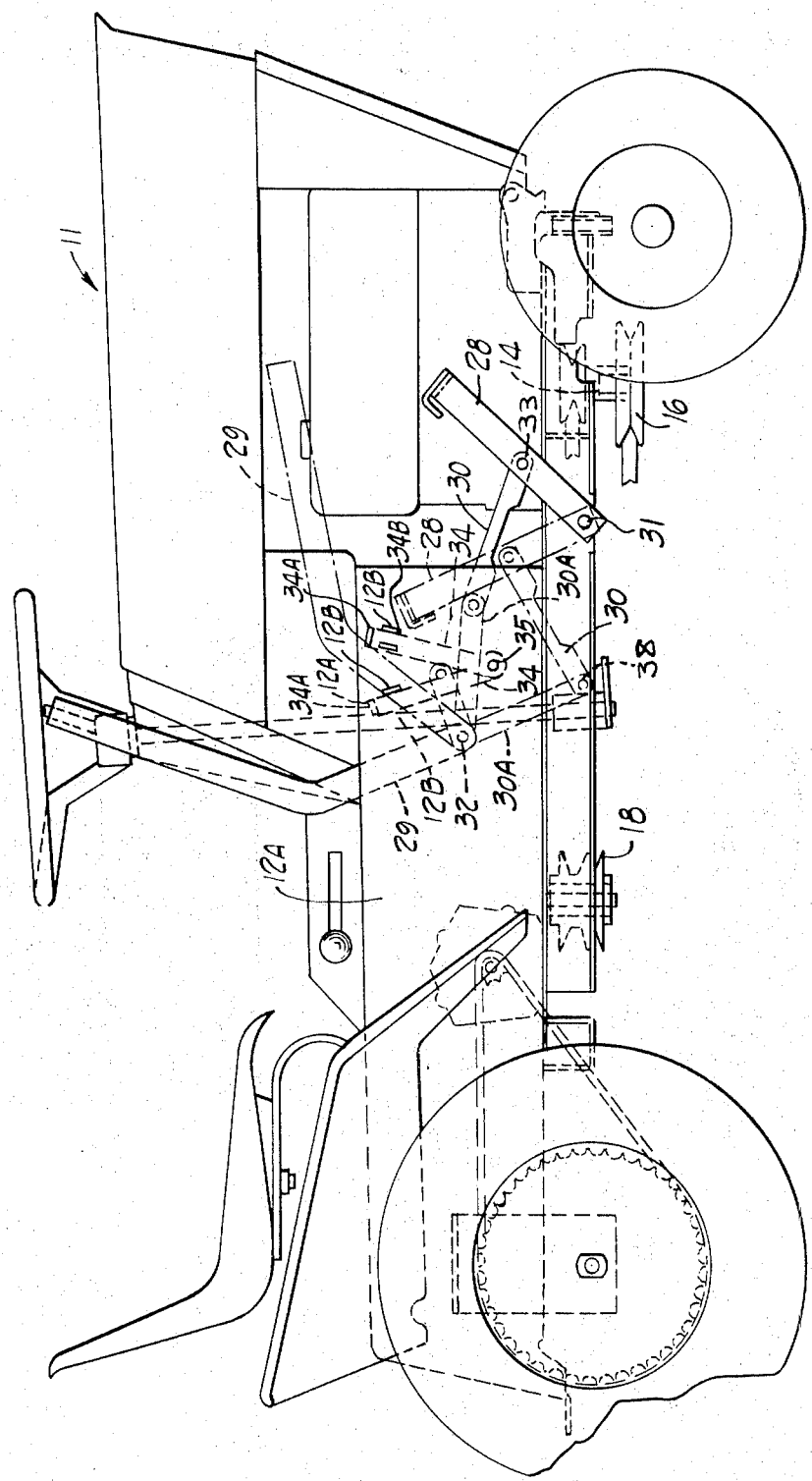

VARIABLE SPEED DRIVE HAVING SPEED LIMITING MEANS

This application is a division of application Ser. No. 116,443, filed Feb. 18, 1971, now U.S. Pat. No. 3,583,535, issued May 30, 1973.

The present invention is a variation or modification of my invention disclosed in my copending U.S. Pat. application Ser. No. 793,339, filed Jan. 23, 1969.

An object of my invention is the provision of a unique combination of a variable speed drive mechanism and structure for adjustably limiting the range of speed variation.

Another object is the provision for setting the maximum speed setting for a variable speed drive mechanism of the pulley-and-belt type of drive.

Another object is to provide for better control and increased safety of a tractor or the like having a variable speed drive.

Other objects and a fuller understanding of this invention may be had by referring to the following description and claims, taken in conjunction with the accompanying drawings, in which:

FIG. 2 is a side view, partly in section (but with the grass cutting unit removed for clarity of illustration);

Figure 1:
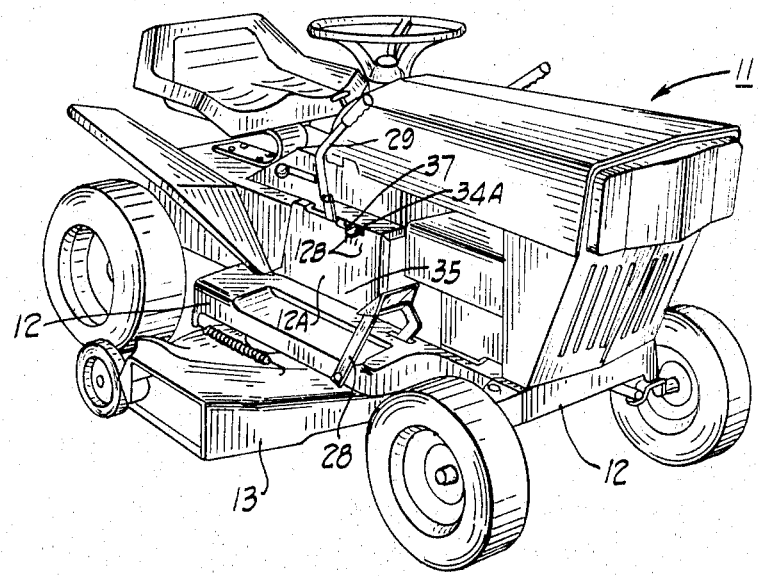
FIG. 1 is a perspective view of a tractor having my invention embodied therein, and showing a grass cutting unit mounted on the tractor.

A typical tractor to which my invention is well adaptable is the tractor denoted generally by the reference character 11, one of the uses of which is the mowing of lawns. A perspective view of the tractor 11 is shown in FIG. 1 and a side view, partially in section, is shown in FIG. 2. The tractor 11 has a frame 12 and extending upwardly from frame 12 is a side wall 12A enclosing the upper portions of the tractor. In the tractor illustrated there is a grass cutting unit 13 suspended from below the frame and which has cutting blades driven by the tractor engine. In FIG. 2 the cutting unit has been removed for purposes of clarity in illustration.

Figure 3:
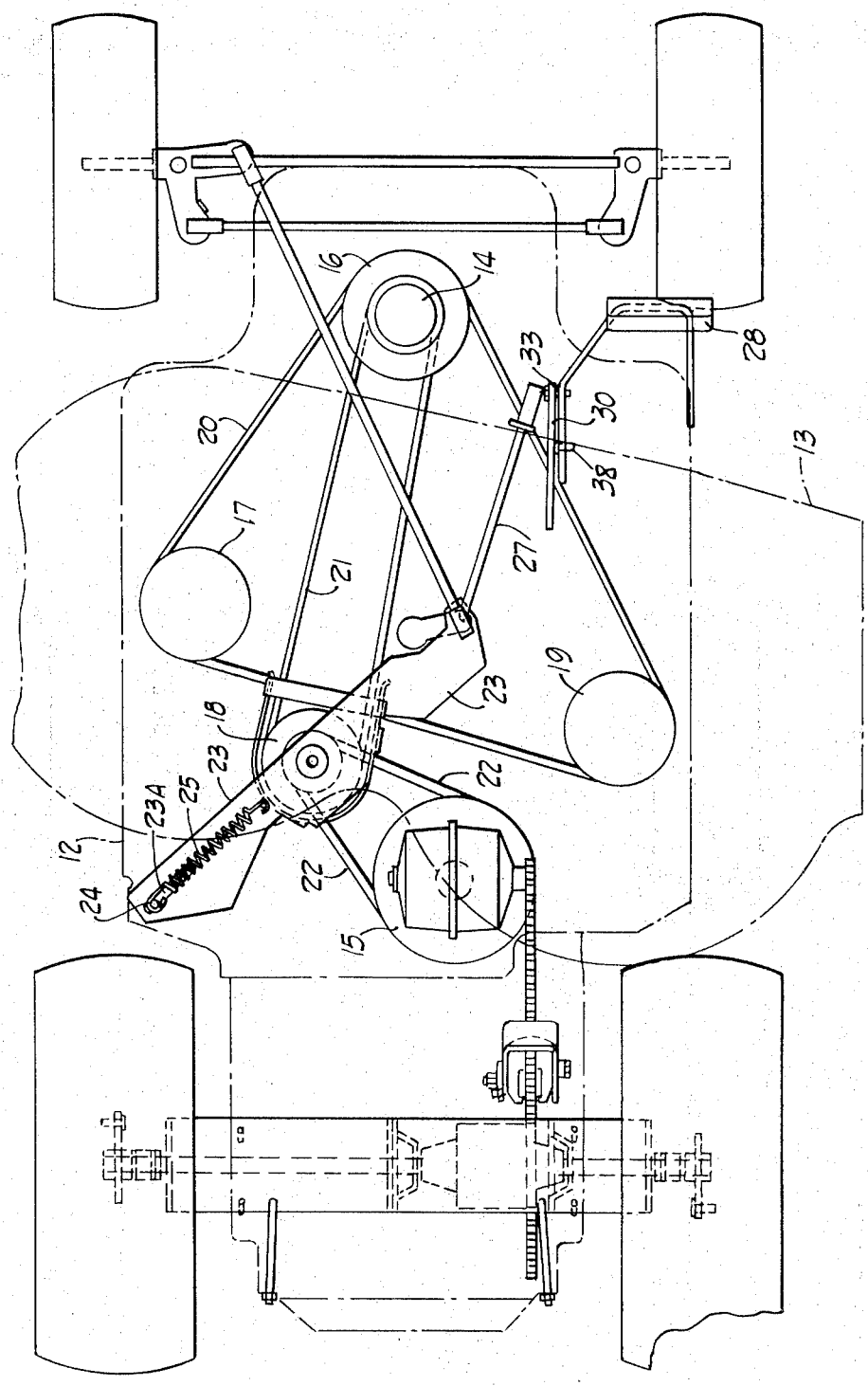
FIG. 3 is a downwardly looking plan view of the tractor shown in FIG. 1 with the upper portions thereof to better illustrate the structure and arrangement of parts embodied in my invention.
Figure 4:
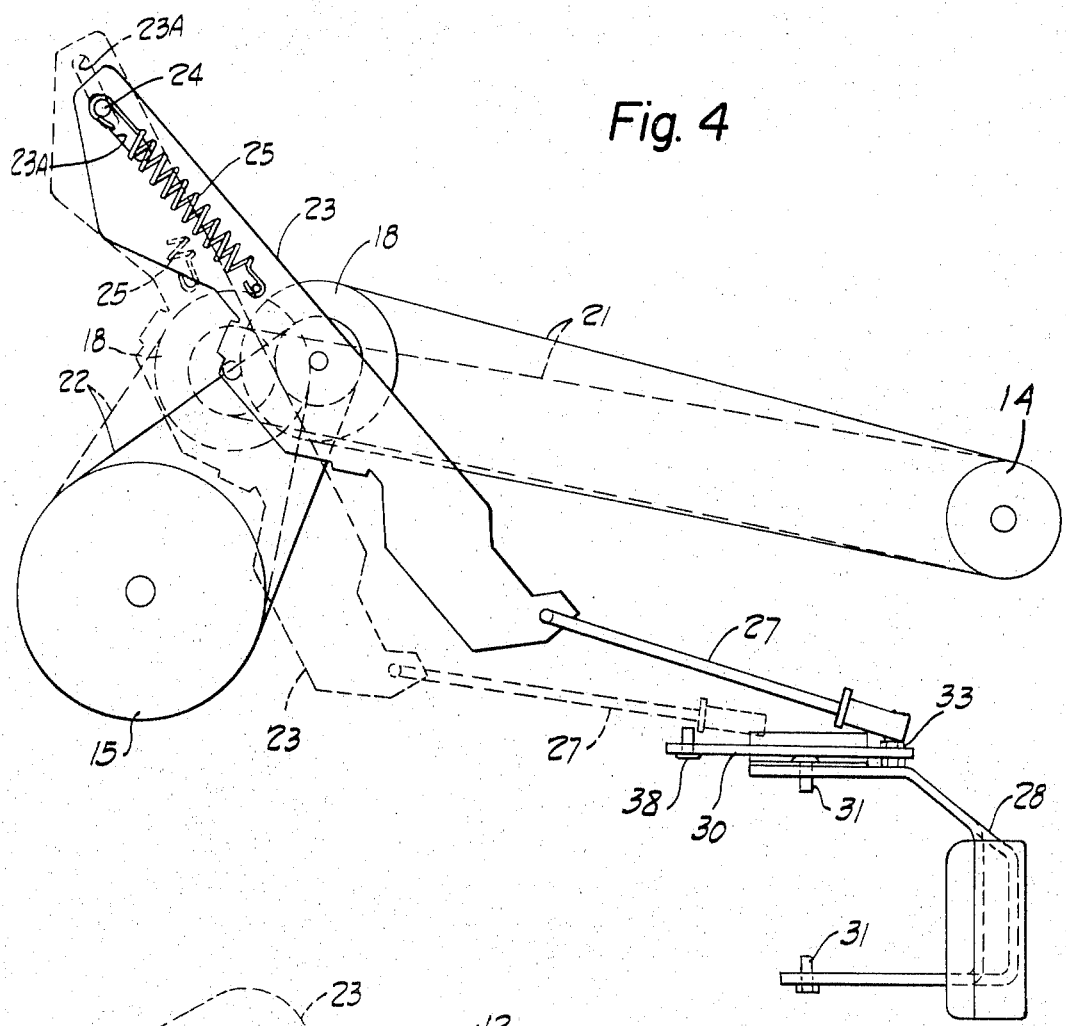
FIG. 4 is an enlarged detail view illustration of the parts of my invention illustrated in FIG. 3 (but looking upwardly rather than downwardly as in FIG. 3 and with the parts shown in different positions)

As better seen in FIG. 2, 3 and 4, the driving mechanism includes a driving pulley 14 which is driven by the invention, and a driven pulley 15 which is operatively connected to drive the rear tractor wheels. The driving pulley 14 has an enlarged pulley portion 16 adapted for driving the rotatable cutting blades of the cutting unit 13. There are two pulleys 17 and 19 mounted on vertical shafts which rotate the cutting blades of the unit in the usual manner. A continuous driving belt 20 is reeved around the pulleys 16, 17 and 19 in such a manner that upon rotation of the driving pulley, made up of pulley parts 14 and 16, pulleys 17 and 19 are simultaneously rotated to rotate the cutting blades.

There is a variable speed sheave assembly 18 journalled on an arm 23. The stub shaft on which the sheave assembly 18 rotates is secured to the arm 23 and extends in a vertical direction from the horizontal plane of the arm 23. As the arm 23 is moved, the axis of the sheave assembly 18 is correspondingly moved. The sheave assembly 18 is similar in construction and operation to the sheave assembly 18 shown and described in my co-pending U.S. Pat. application Ser. No. 739,339, filed Jan. 23, 1969.

There is a belt 21 reeved about driving pulley 14 and one of the grooves in the variable speed sheave assembly 18 whereby the driving pulley 14 rotates the sheave assembly 18. There is another belt 22 reeved about the driven pulley 15 and the other groove of the variable speed sheave assembly 18, whereby rotation of the sheave assembly 18 rotates the pulley 15 and thus drives the rear tractor wheels.

The arm member 23 upon which the sheave assembly 18 is mounted, has one end pivotally mounted on a pivot pin 24 secured to the frame 12. The pivot pin 24 is in a generally vertical alignment relative to the horizontal plane of the frame 12. The arm member 23 has a longitudinal slot 23A extending longitudinally of the arm 23 and in the end portion adjacent the pin 24. The pin 24 extends through the slot 23A whereby the arm 23 may swing in a horizontal plane about the axis of the pivot pin 24. Thus the location of the axis of the sheave assembly 18 is varied by the swinging of the arm 23.

A coil spring 25 extends longitudinally of the arm 23 and has one end anchored to the pivot pin 24 and the other end anchored to a pin in the arm 23. The bias of the spring 25 is such that it is under tension and tends to resiliently urge the arm 23 toward the pivot pin 24 at its fixed location on the frame 12. Thus the sheave assembly 18 is also resiliently urged in a direction toward the pivot pin 24.

The position or location of the pivot pin 24 is such that the spring 25 urges the sheave assembly 18 in such a direction as to maintain driving tension on both the belts 21 and 22 at all times. Thus whether the arm 23 is swung toward high-speed position or toward low-speed position, the belts 21 and 22 are nevertheless maintained in driving tension by the bias of the spring 25.

In the preferred form of my invention, the pivot pin 24 is so located on frame 12 that the arm 23 and hence the sheave assembly 18 are not only urged in a belt tensioning direction, but also in a direction as to urge the sheave assembly 18 toward a high-speed position. Thus, the spring 25 performs a dual function of not only maintaining driving tension on the belts 21 and 22 but also of resiliently urging the sheave assembly 18 toward its high-speed position and away from its low-speed position. For obtaining this purpose, the pivot pin 24 is located somewhat more toward the rear of the tractor (more toward the left in FIG. 3) than it would be located if it merely performed the function of maintaining driving tension on belts 21 and 22. The difference in the two locations need not be great and it is determined by how much resilient urging is desired for biasing the mechanism toward high-speed operation. In view of the dual function of the spring 25, it may be said that in this preferred arrangement that there is included resilient biasing means for maintaining the belts 21 and 22 in belt tensioning condition and also resilient biasing means for urging the sheave assembly 18 toward one of its speed positions, which speed position preferably would be its high-speed position.

The slot 23A permits the arm 23 to move longitudinally under the tension of the spring 25 relative to the pivot pin 24 inserted in the elongated slot 23A.

Connected to the free end of the arm 23 is a connecting rod 27 which is provided for manually swinging the free end of arm 23 forwardly or rearwardly as desired. An actuating foot pedal 28 is pivotally carried on pivot 31 secured to the frame 12. The pedal 28 is connected through connection 33 to rod 27.

Thus the operator's foot by pressing the foot pedal 28 will move the pedal towards low-speed position and by permitting the foot pedal 28 to pivotally swing backward towards the rear of the tractor will permit the pedal to move toward high-speed position, toward which it is resiliently urged.

The actuating pedal 28 is operatively connected through a hinge linkage 30, 38 and 30A to a hand actuating lever 29 in such manner that the pedal 28 and lever 29 move simultaneously. When the pedal 28 is depressed towards low-speed position the upper handle end of lever 29 will simultaneously move backwardly and upwardly toward its low-speed position. Thus the mechanism is actuatable between high-speed and low-speed positions, and in positions therebetween, by either or both of the pedal 28 and lever 29. The lever 29 is pivotally carried on the pivot pin 32 secured to the side wall 12A of the tractor frame. A connecting mechanism 33 so interconnects the pedal 28 and lever 29 such that movement of the pedal 28 and lever 29 correspondingly moves the connecting rod 27 and thus to swing the arm 23 between its high and low-speed positions.

In FIG. 4, the low-speed position of connecting rod 27, arm 23, sheave assembly 18, and belts 21 and 22 is shown in full lines. Contrariwise, the high-speed position of connecting rod 27, arm 23, sheave assembly 18, and belts 21 and 22 is shown in broken lines.

In view of the fact that in this preferred form of my invention the mechanism is resiliently urged toward high-speed position, it may be noted that in the absence of some limitation or stop means, that the tractor would tend to immediately and always go to its high-speed operation. In the operation of a tractor, such as a tractor used for mowing grass on slopes and the like or under different driving conditions, it is desired to provide in many circumstances a maximum high-speed for the device. This is done by having an adjustable limiting means which stops movement of the actuating parts beyond a pre-selected position. In the preferred form of my invention, and in particular shown in FIGS. 1 and 2, there is provided a limiting finger member 34 pivotally carried by the frame 12 on a pivot pin 35 whereby the upper end of the finger member 34 may be pivotally swung forwardly and rearwardly. This finger member 34 is positioned inboard of the side wall 12A of the tractor and closely adjacent to the side wall. There is a slot 37 at a location above the pivot pin 35 through which the upper end of the finger member 34 protrudes. The upper free end of the finger member 34 is a bentover upper end portion 34A which extends outwardly from the side wall 12A in a position to be manually grasped by the operator and thus to swing the finger member 34 forwardly and rearwardly as desired. Close to and below the upper end portion 34A there is a detent portion 34B integrally carried by the finger member 34. This detent portion 34B is formed by bending a side edge portion of the finger member 34 at right angles to the plane of the finger member 34. This detent portion 34B is directed outwardly of the tractor housing and thus toward the side wall 12A.

A side wall 12A of the tractor has a plurality of slits 12B arranged in an arc about the axis of the pivot pin 35. These slits 12B being spaced apart. In the illustration shown there are four slits 12B arranged in such an arc. The size of each slit 12B is such that the detent portion 34B of the finger member 34 may extend into and through a respective slit 12B.

The mounting of the finger member 34 and its construction is such that the upper end portion 34A is resiliently biased outwardly of the tractor and thus to urge the detent portion 34B outwardly through one of the slits 12B when aligned therewith. Thus the operator sitting on the tractor 11, by seizing the bentover portion 34A and pressing it inwardly of the tractor, may disengage the detent portion 34B from a slit 12B and thus move the finger member 34 to any of selected of the four alternate positions provided by the four slits 12B. The finger member 34 may thus be permitted to move under its bias so as to insert its detent portion 34B into the selected one of the four slits 12B.

Inasmuch as the bent over end portion 34A is in the arcuate path of the lever 29, it is seen that the position of the finger member 34 determines how far forwardly and downwardly the lever 29 may swing. As lever 29 and pedal 28 are operatively interconnected, the position of the finger member 34 also determines how far rearwardly and upwardly the pedal 28 may be depressed.

There is thus provided a practical and economical arrangement for providing a limiting stop so as to set the upper limit to which the driving mechanism may go towards high-speed operation. The operator of the tractor may thus determine the range of permissible movement of the actuating mechanism and thus provide for the maximum range of speed. By setting the finger member to selected position, the maximum speed to which the tractor will go may be predetermined.

Figure 5:
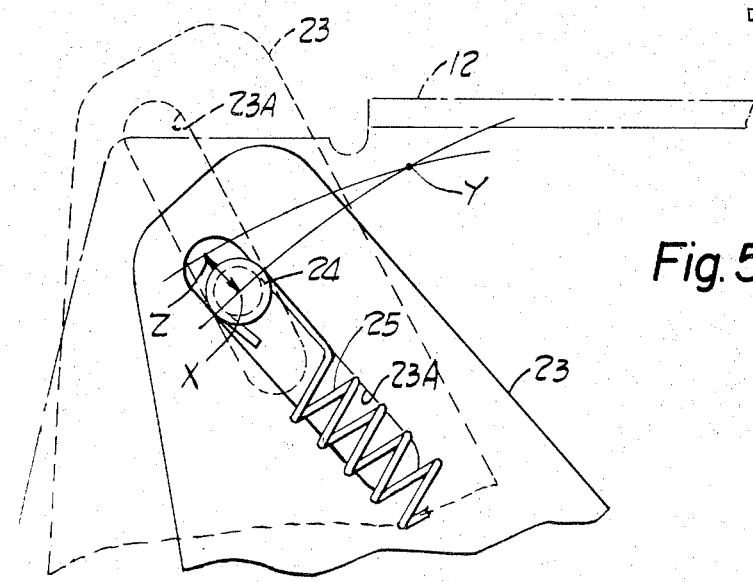
FIG. 5 is an enlarged detail view of a portion of the parts illustrated in FIG. 4, and as appearing in the preferred form of my invention.

In FIG. 5 the reference character X indicates the location of the axis of the pivot pin 24 in the preferred form of the invention, such as shown in FIGS. 1 to 5 inclusive. In FIG. 5, the distance between X to Z represents the differnece in the length of the spring 25 between high and low speeds when the parts are in the preferred form of said FIGS. 1 to 5 inclusive. The reference character Y illustrates the location of the axis of the pivot pin 24 if it were located so that only maintenance of driving tension is maintained on belts 21 and 22 but not so as to urge the mechanism toward either high or low speed position. This point Y might be referred to as a neutral position insofar as the spring 25 urging the arm 23 in a direction to maintain driving tension on belts 21 and 22.

Figure 6:
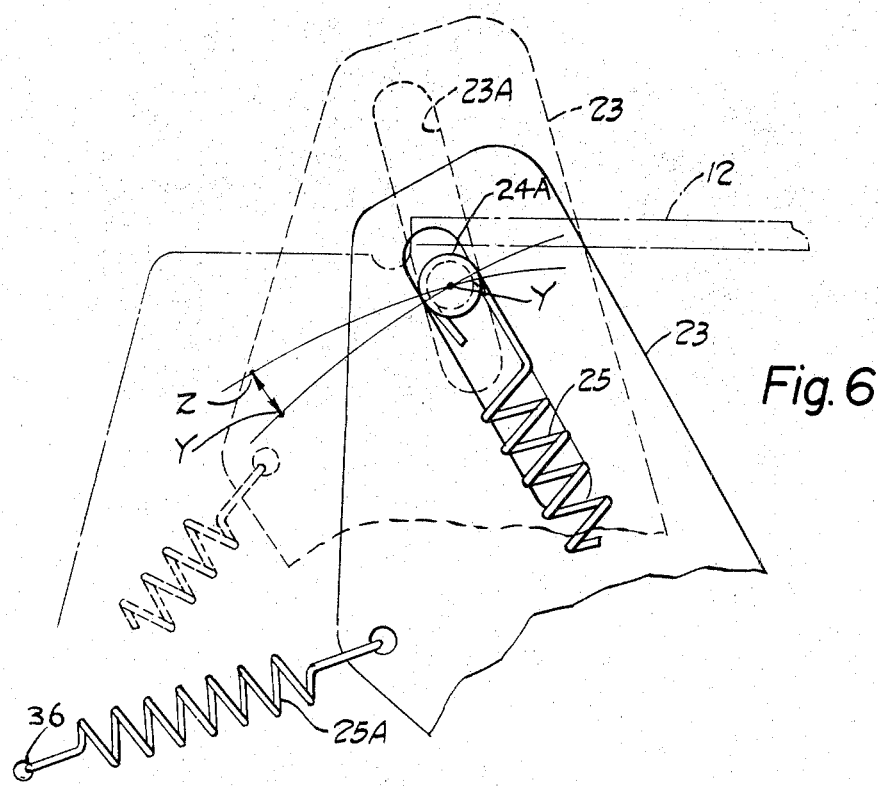
FIG. 6 is similar to the showing of FIG. 5, but shows the parts as appearing in a modified form of my invention.

In FIG. 6 there is illustrated a modified form of my invention. In this modified form of the invention, a pivot pin, now denoted by the reference character 24A, is located at the "neutral" position Y. When in this position, the spring 25 only biases the sheave assembly 18 in a direction to maintain driving tension in belts 21 and 22. Thus, in this modified form, the spring 25 performs only this single function as described. In this modified form illustrated in FIG. 6, there is provided a helper spring 25A which provides the other resilient biasing function. One end of the helper spring 25A is anchored to the arm 23 and the other end is anchored by an anchor pin 36 to the frame 12. The tension on helper spring 25A is such as to resiliently urge the arm 23 to the left in FIG. 6 and thus to urge the arm 23 to swing toward high-speed position. Thus in FIG. 6, two springs are utilized for obtaining the dual biasing function whereas in the preferred form of FIGS. 1 to 5 inclusive, one spring 25 is utilized. In both cases the driving mechanism is urged toward its high-speed position and in both modifications a limiting means for limiting the maximum movement of the actuating mechanism towards high-speed position, such as previously described, is utilized.

In the use of a tractor utilizing my invention, the operator of the tractor may determine the maximum speed (obtainable with the particular tractor) at which he wishes to proceed under the situation and conditions then in existence. He sets this desired maximum speed by pre-setting the position of the finger member 34 to one of its plural alternate positions by manually moving the portion 34A to a desired location where detent portion 34B engages in a slit 12B at that location.

During the travel of the tractor, if the operator does not manually move or otherwise control either the pedal 28 or the lever 29, then the resilient bias on the parts in such that the pedal 28 will swing upwardly and rearwardly toward its high-speed position, and the upper end of lever 29 will swing forwardly and downwardly toward its high-speed position, both to the limit determined by the pre-setting of the finger member 34 to selected position. Upon the operator desiring to cause the tractor to travel at a lower rate of speed, he may press down and forwardly on the pedal 28 to depress the same to obtain the lower speed desired, or to a completely depressed position to stop the driving of the tractor. Similarly, to cause the tractor to travel at a lower rate of speed the operator may swing the upper end of the lever 29 rearwardly and upwardly to obtain the lower speed desired, or to a completely rearward position to stop the driving of the tractor. As both pedal 28 and lever 29 move in unison, the operator may thus readily control the speed of the tractor by manipulating either pedal 28 or lever 29, or by simultaneously manipulating both pedal 28 and lever 29.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a driving mechanism for a tractor having a frame, the mechanism having a variable-pitch sheave assembly operatively connected by belts to a driving pulley and a driven pulley for changing the speed ratio of said pulleys between to obtain a high-speed rate and a low-speed rate of the driven pulley upon swinging of said sheave assembly between a low-speed position and a high-speed position to vary the spacing of the axis of the sheave assembly relative to the axes of said pulleys, resiliently yieldable belt-tensioning means for urging said sheave assembly in a direction for maintaining the driving tension on said belts during movement of the sheave assembly between low-speed and high-speed positions, said belt-tensioning means exerting a first component of force tending to urge said sheave assembly away from high-speed position in maintaining the tension on said belts, the improvement of resilient biasing means anchored to said frame and operatively connected to said sheave assembly, said resilient biasing means being anchored to said frame and disposed to exert a second component of force tending to urge said sheave assembly toward high-speed position, said second component of force being substantially greater than said first component of force whereby the said sheave assembly is resiliently urged toward high-speed position, and adjustable limiting means carried by the frame and selectively adjustable to a plurality of limit positions to limit the maximum extent of the range of movement of the sheave assembly toward high-speed position and thus limiting the maximum speed of the driven pulley.

2. The improvement as claimed in claim 1 and in which said belt-tensioning means and said resilient biasing means are combined in a single resilient means.

3. The improvement as claimed in claim 1 and in which the belt-tensioning means is a first spring extended in a line generally coinciding with the line of said first component of force and said resilient biasing means is a second spring extended in a line generally coinciding with the line of said second component of force.

* * * * *

UNITED STATES PATENT OFFICE
CERTIFICATE OF CORRECTION

Patent No. 3,777,585          Dated   December 11, 1973

Inventor(s) Gunter F. Plamper

It is certified that error appears in the above-identified patent and that said Letters Patent are hereby corrected as shown below:

On the cover sheet item [62] "Pat. No. 3,583,535" should read -- 3,759,342 --. Column 1, line 3, "3,583,535 issued May 30, 1973" should read -- 3,759,342 issued September 18, 1973 --.

Signed and sealed this 3rd day of December 1974.

(SEAL)
Attest:

McCOY M. GIBSON JR.          C. MARSHALL DANN
Attesting Officer           Commissioner of Patents